July 25, 1961 F. GOATCHER 2,994,070

SHIFTING REGISTERS

Filed April 25, 1958 2 Sheets-Sheet 1

Inventor
F. Goatcher
By Glascock Downing & Seebold
Attys.

July 25, 1961 F. GOATCHER 2,994,070

SHIFTING REGISTERS

Filed April 25, 1958 2 Sheets-Sheet 2

Inventor
F. Goatcher
By Glascock Downing & Seebold
Attys.

2,994,070
SHIFTING REGISTERS

Frank Goatcher, Ashford, England, assignor to Electric & Musical Industries Limited, Hayes, Middlesex, England, a company of Great Britain
Filed Apr. 25, 1958, Ser. No. 730,967
Claims priority, application Great Britain Apr. 30, 1957
3 Claims. (Cl. 340—174)

This invention relates to shifting registers such as are employed in digital computing apparatus.

It has been proposed to provide as a shifting register, a series of magnetisable cores coupled by links each of which links one core with the succeeding core. The register utilises the properties of the hystersis loop and the binary digit values "0" and "1" are assigned to the opposite states of remanence magnetism of the cores. In addition to the links each core is associated with a coupling whereby current pulses are applied to set up a magnetising force of such magnitude and polarity that if the respective core is in state "1" it is changed to state "0" and by reason of the link with the next core, this change is accompanied by a change in the next core from state "0" to state "1" no change being effected in the state of either core if a current pulse occurs when the first core is in state "0." Such current pulses are referred to as advancing pulses since they are effective to advance digital information stored in one core to the next core. Digital information is fed in time-serial manner to the first core of the register so that this core assumes the state representative of the value of each digit in turn, each digit being propagated to the next core by advancing pulses applied to the first core mid-way between digit times, advancing pulses being applied to all the odd-numbered cores at the same time. Moreover, advancing pulses are applied to each intervening core at digit times, and the effect is that each digit is shifted by a distance of 2 cores in each digit interval. There are therefore 2 cores per digit and for this reason a register of this form is referred to as a two core unit shifting register.

The object of the present invention is to provide a shifting register in which the information may be propagated. A further object of the present invention is to provide a shifting register stage in which amplification is provided in the shifting paths to reduce degeneration of the information and in which the amplification is achieved by a relatively small number of amplifiers.

Figure 1:
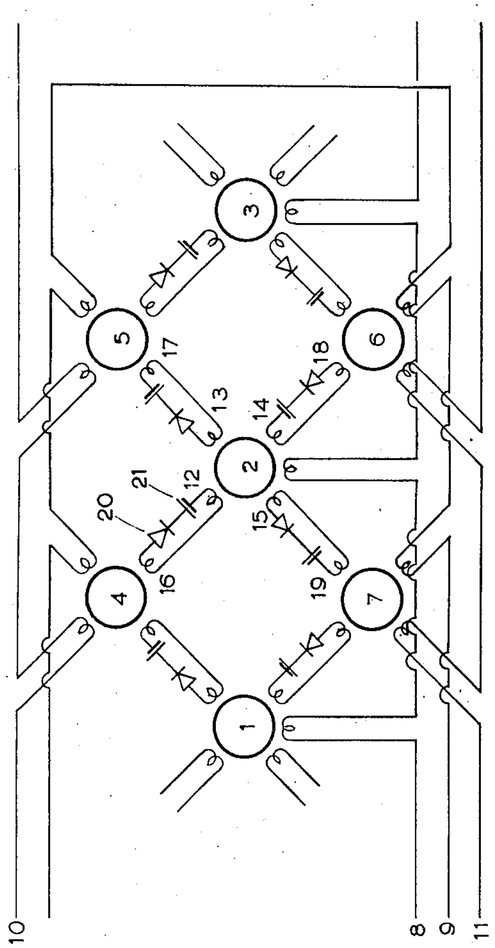
Figure 2:
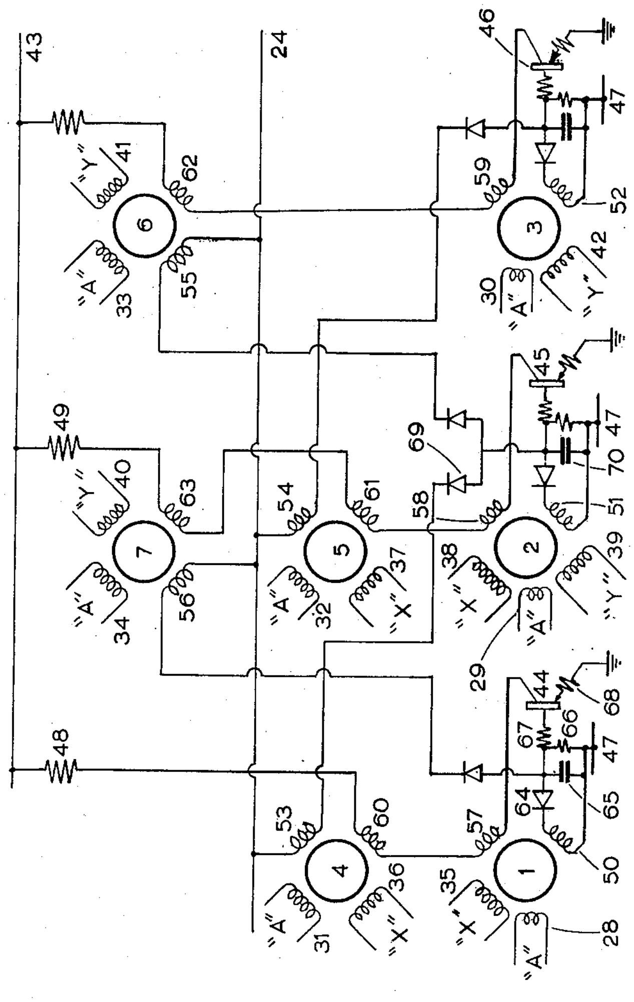

In order that the invention may be fully understood and readily carried into effect, it will now be more fully described with reference to the accompanying drawings, in which:

FIGURE 1 illustrates shifting register capable of projecting information in either direction, and FIGURE 2 illustrates an embodiment of the present invention, which is a development of the shifting register shown in FIGURE 1 in that amplification is provided in the shifting paths.

Referring to FIGURE 1 there is illustrated an elementary shifting register comprising magnetisable cores 1 to 7. The cores are arranged in three series, the first series comprising the cores 1, 2 and 3 which may be termed the principal or storage cores, the second series comprising the cores 4 and 5 which may be termed first subsidiary cores, and the third series comprising the cores 6 and 7 which may be termed second subsidiary cores. Taking the core 2 for example, it is linked by windings 12 and 16 to the core 4, the link being completed as shown by a polarised device, for example a diode 20, and a bias voltage source represented symbolically by the battery 21. The core 2 is also linked by windings 13 and 17 to the core 5, by windings 14 and 18 to the core 6, and by the windings 15 and 19 to the core 7. The same pattern of connection would be repeated for each other principal core, except the end cores of the respective series. Each link from a principal core to a subsidiary core includes a polarised device and a bias voltage source, like 20 and 21, the direction of easy conduction in the polarised devices being selected to provide for propagation from left to right only (in the drawings) via the subsidiary cores 4 and 5, and to provide for propagation from right to left (in the drawings) via the subsidiary cores 6 and 7.

Advancing pulses are applied to the principal cores by a line 8 and to the subsidiary cores by a line 9, the pulses being applied alternately to 8 and 9. The lines 8 and 9 are coupled to the cores by windings as indicated. Either a steady D.C. bias or one which pulsates with a waveform similar to that of the advancing pulses from the source 8 is applied to 10 for propagation to the right or to 11 for propagation to the left. The pulse and bias sources may be of any suitable construction, many being well known in the art. To facilitate illustration, windings are shown at the side of the respective cores, although it will be understood that in practice they are wound round the cores.

Assume that the core 2 is in the "1" state, an advancing pulse from the source 8 changes the core to the "0" state, thereby inducing a voltage pulse in the four windings 12, 13, 14 and 15. The propagation of these pulses from the windings 12 and 14 to the windings 16 and 18 and thence to the cores 4 and 6 respectively is prevented by the biased diode arrangements in the links connecting the cores in the manner described in United States Patent Number 2,683,819. On the other hand the pulses in the windings 13 and 15 are able to pass through the diodes to the windings 17 and 19. However the windings 17 and 19 have insufficient turns for the pulses to set the cores 5 and 7 to the "1" state by themselves, but if there is a bias from the source 10 through the associated windings the core 5 is enabled to be set to the "1" state by the pulse from the core 2, and, there being no bias from the source 11, the core 7 is not able to be set to the "1" state.

In this manner the information is propagated to the right by the advancing pulses if there is a bias on the line 10. Conversely, if there is a bias on the line 11, but not on the line 10, the information is propagated towards the left.

Although this register has been described with shift pulses on the lines 8 and 9, and bias voltages which determine the direction of propagation on lines 10 and 11, it is quite possible to arrange the circuit to shift information to the right under control of advancing pulses on lines 8 and 10 and to the left in response to advancing pulses on lines 8 and 11. A bias voltage could be applied to the line 9 so as to assist propagation in the desired direction but to inhibit it in the reverse direction.

Referring to FIGURE 2, apparatus according to the present invention comprises magnetisable cores 1, 2, 3, 4, 5, 6 and 7 with associated windings, amplifiers, pulse lengthening devices and sources of advancing pulses. The cores 1 to 7 correspond to the similarly numbered cores in FIGURE 1. The purpose of the apparatus is to transfer the state of the core 1 to the core 2, and the state of the core 2 to the core 3, and so on, or to transfer the state of the core 3 to the core 2, and the state of the core 2 to the core 1 and so on. Advancing pulses "A" are applied to the windings 28, 29, 30, 31, 32, 33 and 34. Advancing pulses "X" which are of longer duration than the "A" pulses and of half the frequency but which start simultaneously with them and are used to propagate the information from left to right are applied when required to windings 35, 36, 37 and 38. Advancing pulses "Y" are identical and synchronous with the "X" pulses and are used to propagate information from right to left are applied when required to windings 39, 40, 41 and 42. The "A" pulses are applied to the apparatus all the time but the "X" and "Y" pulses only when it is required to shift information to the right or left, respectively. The "X" and "Y" pulses are not applied together. 43 is a source of polarising voltage for transistors 44, 45 and 46, and 47 is a source of bias voltage for them. Resistors 48 and 49 are provided for current limitation. Output windings in the cores 1 to 7 are denoted by references 50 to 56, whilst input windings are denoted by the references 57 to 63. The polarity and "strength" of the various windings will be apparent in the following explanation.

Assume that the core 1 is in the "1" state, an "A" pulse through winding 28 changes the core to the "0" state, inducing a current in the winding 50, which passes through a diode 64 to charge a condenser 65 negatively. The condenser 65 is shunted by a resistor 66. The negative voltage on the condenser 65 is applied via resistors 67 and 68 across the emitter-base circuit of the transistor 44, thereby causing it to conduct heavily. The output current pulse from the transistor 44 being "stretched" relative to the advancing pulse by reason of the components 64, 65 and 66. This output current, following through the winding 57, tends to set the core 1 to the "1" state but is prevented from so doing by the advancing pulse "X" which is as long as or longer than the output pulse from the transistor. The current also flows through the winding 60 tending to set the core 4 to the "1" state, and through the current limiting resistor 48. The combination of the "X" pulse in the winding 36 and the current pulse in the winding 60 is sufficient to set the core 4 to the "1" state at the end of the "A" pulse on winding 31. With a second set of pulses, the "A" pulse on winding 31 changes the core 4 to the "0" state, thus inducing an output pulse in the winding 53 which passes through a diode 69 to charge a condenser 70. There is no "X" pulse coincident with this "A" pulse as their frequency is only half of that of the "A" pulses. The transistor 45 which is connected in a circuit similar to that of the transistor 44, conducts heavily and the core 2 is set to the "1" state by the current through winding 58. The windings 61 and 63 are not sufficiently energised to set the cores 5 and 7 to the "1" state in the absence of "X" and "Y" pulses, and are therefore unaffected. The resistor 49 is a current limiting resistor for the transistor 45.

An "A" pulse through winding 29 now changes the core 2 to the "0" state and with a second "X" pulse will cause the core 5 to be set to the "1" state as explained above, via the winding 61 and the "X" pulse on winding 37. The next "A" after that will change the core 5 to the "0" state causing an output pulse in the winding 54 and the subsequent setting to the "1" state of the core 3.

Thus the information is stepped along the register from left to right.

In a similar manner, under the influence of "A" pulses and "Y" pulses the information is stepped to the left from the core 3 via the core 6 to the core 2, and via the core 7 to the core 1.

In the apparatus illustrated in FIGURE 2, the cores 1, 2 and 3 comprise first, second and third main storage devices and the cores 4, 5, 7 and 6 constitute first, second, third and fourth auxiliary storage devices. Moreover the circuit connections are such that in response to advancing pulses "A" and shift-forward pulses "X," a signal corresponding to one state of the storage devices can be shifted from the first to the second to the third of the main storage devices via the first and second auxiliary storage devices 4 and 5. Similarly in response to advancing pulses "A" and shift-backward pulses "Y," a signal corresponding to one state of the two state devices can be shifted from the third to the second to the first of the main storage devices via the fourth and third auxiliary storage devices 6 and 7.

The circuit may also be operated with the "X" and "Y" pulses of the same frequency as the "A" pulses in which case the information is stepped from core 1 to core 4, from core 4 to core 5 and from core 5 to core 3 under the influence of "A" pulses and "X" pulses. With "A" pulses and "Y" pulses the information is stepped from core 3 to core 6, from core 6 to core 7, and from core 7 to core 1. The detailed operation of the circuit will be obvious from the description of the operation of the previous arrangement.

It will be appreciated that the transistor 45 and its circuit connection comprises an amplifier common to the four paths which couple the core 2 with the cores 1 and 3. The same would be true of the amplifiers comprising the transistors 44 and 46, if the register be extended to the left and right. The transistor 45 receives signals from the core 2 and feeds the path leading from the core 2 to the cores 5 and 7. It also receives input signals from the paths from the cores 1 and 3 leading to the core 2, and applies these signals after amplification to the core 2 via the winding 58. This of course means that the transistor 45 tends to feed back to the core 2, signals read from this core, but such feedback is inhibited by the "X" pulses.

Although the circuit has been described with respect to elementary three unit shifting registers, it will be understood that usually registers in practice will be longer. A longer register may of course be constructed merely by repeating the connection shown as many times as desired.

The magnetisable cores may be made of an alloy, or may be made of a ferrite, and other two state devices may also be employed instead of magnetisable cores.

What I claim is:

1. A shifting register stage, such as may be employed in digital computing apparatus, comprising a main storage device, first, second, third and fourth auxiliary storage devices, each storage device having a first state and a second state, an amplifier, means for applying an input signal to said amplifier in response to a change of any one of said main storage device said first auxiliary storage device and said fourth auxiliary storage device from said first state to said second state, means for applying the resultant output signal of said amplifier to said main storage device said second auxiliary storage device and said third auxiliary storage device to tend to switch each of said last mentioned devices from said second state to said first state, means for applying repetitive advancing pulses to said main storage device, said first auxiliary storage device and said fourth auxiliary storage device with an amplitude sufficient to change each of said storage devices from said first state to said second state and thereby induce an output signal in said amplifier, and means for selectively enabling and disabling said main storage device said second auxiliary storage device and said third auxiliary storage device for response to the output signal of said amplifier, so that a signal corresponding to the first state of said devices can be shifted in response to advancing pulses from the first to the second of the auxiliary storage device via said main storage device or from the fourth to the third of said auxiliary storage device via said main storage device.

2. A shifting register, such as may be employed in digital computing apparatus, comprising first, second and third main storage devices, first, second, third and fourth auxiliary storage devices, each storage device having a first state and a second state, first, second and third amplifiers corresponding respectively to said first, second and third main storage devices, means for applying an input signal to said first amplifier in response to a change of any one of said first main storage device and said third auxiliary storage device from said first state to said second state, means for applying the resultant output signal of said first amplifier to said first main storage device and said first auxiliary storage device to tend to switch each of them from said second state to said first state, means for applying an input signal to said second amplifier in response to a change of any one of said second main storage device said first auxiliary storage device and said fourth auxiliary storage device from said first state to said second state, means for applying the resultant output signal of said second amplifier to said second main storage device said second auxiliary storage device and said third auxiliary storage device to tend to switch each of them from said second state to said first state, means for applying an input signal to said third amplifier in response to a change of any one of said third main storage device and said second auxliary storage device from said first state to said second state, means for applying the resultant output signal of said third amplifier to said third main storage device and said fourth auxiliary storage device to tend to switch each of them from said second state to said first state, means for applying repetitive advancing pulses to all of said storage devices with an amplitude sufficient to change each of said storage devices from said first state to said second state and thereby induce an output signal in the respective amplifier, means for selectively enabling and disabling said storage devices for response to the output signals of the respective amplifiers, so that a signal corresponding to the first state of said devices can be shifted in response to advancing pulses from the first to the second to the third of said main storage devices via the first and second auxiliary storage devices or from the third to the second to the first of said main storage device via the fourth and third of said auxiliary storage devices.

3. A shifting register stage, such as may be employed in digital computing apparatus, comprising a main storage device, first, second, third and fourth auxiliary storage devices, each storage device having a first state and a second state, an amplifier, means for applying an input signal to said amplifier in response to a change of any one of said main storage device said first auxiliary storage device and said fourth auxiliary storage device from said first state to said second state, means for applying the resultant output signal of said amplifier to said main storage device with an amplitude sufficient to switch that device from said second state to said first state, means for applying a resultant output signal of said amplifier to said second auxiliary storage device and said third auxiliary device with an amplitude insufficient to switch either of said last mentioned devices from said second state to said first state, means for applying repetitive advancing pulses to said main storage device said first auxiliary storage device and said fourth auxiliary storage device with an amplitude sufficient to change each of said storage devices from said first state to said second state and thereby induce an output signal in said amplifier, means for selectively applying shift-forward pulses to said second auxiliary device with an amplitude sufficient when added to the output of said amplifier to switch said second auxiliary device from said second state to said first state, means for selectively applying shift-backward pulses to said third auxiliary device with an amplitude sufficient, when added to the output signal of said amplifier, to switch said third auxiliary storage device from said second state to said first state, and means for selectively applying shift-forward and shift-backward pulses to said main storage device to counteract the change of said main storage device from said second state to said first state in response to an output signal from said amplifier, whereby a signal corresponding to the first state of said devices can be shifted in response to advancing pulses and a shift-forward pulse from the first to the second auxiliary storage device via said main storage device and can be shifted in response to advancing pulses and a shift-backward pulse from the fourth to the third and said auxiliary storage devices via said main storage device.

References Cited in the file of this patent

UNITED STATES PATENTS

| | | |
|---|---|---|
| 2,747,101 | Jones | May 22, 1956 |
| 2,781,503 | Saunders | Feb. 12, 1958 |
| 2,831,150 | Wright et al. | Apr. 15, 1958 |
| 2,911,621 | Crooks | Nov. 3, 1959 |